US012125477B2

(12) United States Patent
Chao et al.

(10) Patent No.: US 12,125,477 B2
(45) Date of Patent: *Oct. 22, 2024

(54) HOT-WORD FREE PRE-EMPTION OF AUTOMATED ASSISTANT RESPONSE PRESENTATION

(71) Applicant: GOOGLE LLC, Mountain View, CA (US)

(72) Inventors: Pu-sen Chao, Los Altos, CA (US); Alex Fandrianto, Los Gatos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/235,726

(22) Filed: Aug. 18, 2023

(65) Prior Publication Data

US 2023/0395066 A1   Dec. 7, 2023

Related U.S. Application Data

(63) Continuation of application No. 17/251,511, filed as application No. PCT/US2020/033113 on May 15, 2020, now Pat. No. 11,756,533.

(51) Int. Cl.
*G10L 15/16* (2006.01)
*G06N 3/08* (2023.01)
(Continued)

(52) U.S. Cl.
CPC ............... *G10L 15/16* (2013.01); *G06N 3/08* (2013.01); *G10L 17/00* (2013.01);
(Continued)

(58) Field of Classification Search
CPC ..... G10L 15/16; G10L 17/00; G10L 21/0208; G10L 2015/088; G10L 2021/02082; G06N 3/08
See application file for complete search history.

(56) References Cited

U.S. PATENT DOCUMENTS 7,558,635 B1   7/2009   Thiel et al.
8,185,400 B1   5/2012   Goffin et al.
(Continued)

FOREIGN PATENT DOCUMENTS

| CN | 109767761 | 5/2019 |
| JP | 6535349 | 6/2019 |
| WO | 2015183991 | 5/2015 |

OTHER PUBLICATIONS

Australian Patent Office; Examination Report issued in Application No. 2020447125; 5 pages; dated May 24, 2023.
(Continued)

*Primary Examiner* — Bhavesh M Mehta
*Assistant Examiner* — Edward Tracy, Jr.
(74) *Attorney, Agent, or Firm* — Gray Ice Higdon

(57) ABSTRACT

The presentation of an automated assistant response may be selectively pre-empted in response to a hot-word free utterance that is received during the presentation and that is determined to be likely directed to the automated assistant. The determination that the utterance is likely directed to the automated assistant may be performed, for example, using an utterance classification operation that is performed on audio data received during presentation of the response, and based upon such a determination, the response may be pre-empted with another response associated with the later-received utterance. In addition, the duration that is used to determine when a session should be terminated at the conclusion of a conversation between a user and an automated assistant may be dynamically controlled based upon when the presentation of a response has completed.

19 Claims, 7 Drawing Sheets

(51) Int. Cl.
  *G10L 15/08* (2006.01)
  *G10L 17/00* (2013.01)
  *G10L 21/0208* (2013.01)
(52) U.S. Cl.
  CPC .... *G10L 21/0208* (2013.01); *G10L 2015/088* (2013.01); *G10L 2021/02082* (2013.01)

(56) References Cited

U.S. PATENT DOCUMENTS

| | | | |
|---|---|---|---|
| 9,570,086 | B1 | 2/2017 | Sanders et al. |
| 10,311,872 | B2 | 6/2019 | Howard et al. |
| 10,635,277 | B2 | 4/2020 | Kim |
| 10,966,023 | B2 | 3/2021 | Chavan et al. |
| 11,164,066 | B1 | 11/2021 | Dai et al. |
| 2011/0263325 | A1 | 10/2011 | Atkinson |
| 2013/0307975 | A1 | 11/2013 | Ford et al. |
| 2017/0069308 | A1 | 3/2017 | Aleksic et al. |
| 2018/0143742 | A1 | 5/2018 | Ford |
| 2019/0035390 | A1 | 1/2019 | Howard et al. |
| 2019/0130930 | A1 | 5/2019 | Tong et al. |
| 2019/0304459 | A1 | 10/2019 | Howard et al. |
| 2021/0243304 | A1 | 8/2021 | Chishty |
| 2021/0358483 | A1 | 11/2021 | Chao et al. |

OTHER PUBLICATIONS

Intellectual Property India; Examination Report issued in Application No. 202227061529; 8 pages; dated Jan. 30, 2023.

European Patent Office; International Search Report and Written Opinion of Ser. No. PCT/US2020/033113; 16 pages; dated May 28, 2021.

European Patent Office; Invitation to Pay Additional Fees; Application No. PCT/US2020/033113; 10 pages; dated Mar. 1, 2021.

Tech With Brett; "Google Home Continued Conversation;" retrieved from internet: https://www.youtube.com/watch?v=vEFTQMi6W2I; 8 pages; Jun. 22, 2018.

Synaptics; "AudioSmart;" AudioSmart 2-mic Development Kit for Amazon AVS; www.conexant.com; https://manualzz.com/doc/24015554/audiosmart-hands-free-2-mic-development-kit-for; 4 pages; Nov. 7, 2017.

Australian Patent Office; Examination Report 2 issued in Application No. 2020447125; 4 pages; dated Jul. 21, 2023.

European Patent Office; Communication Pursuant to Article 94(3) EPC issued for Application No. 20730524.4, 5 pages, dated Jun. 4, 2024.

Australian Patent Office; Notice of Acceptance for Patent Application issued in Application No. AU 2020447125; 3 pages; dated Aug. 22, 2023.

European Patent Office; Communication Pursuant to Article 94(3) EPC issued in Application No. 20730524.4; 7 pages; dated Nov. 21, 2023.

Australian Patent Office; Examination Report issued in Application No. 2023274128; 3 pages; dated Aug. 7, 2024.

Intellectual Property India; Hearing Notice issued in Application No. 202227061529; 2 pages; dated Jul. 24, 2024.

China National Intellectual Property Administration; Notification of First Office Action issued in Application No. 202080100833.9, 33 pages; dated Jul. 19, 2024.

Zhang, L et al.; Study of Applications of Siri Personal Assistant for Intelligent Tutor System; China Education Technology; 6 pages; dated Oct. 10, 2012.

HOT-WORD FREE PRE-EMPTION OF AUTOMATED ASSISTANT RESPONSE PRESENTATION

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant generally responds to a command or request by providing responsive user interface output, which may include audible and/or visual user interface output.

Automated assistants enable users to obtain information, access services, and/or perform various tasks. For example, users are able to execute searches, get directions, and in some cases, interact with third party computing services. Users may also be able to perform a variety of actions, such as calling cars from ride-sharing applications, ordering goods or services (e.g., pizza), controlling smart devices (e.g., light switches), making reservations, and so forth.

Automated assistants may converse with users using voice recognition and natural language processing, with some also utilizing machine learning and other artificial intelligence technologies, for instance, to predict user intents. Automated assistants may be adept at holding conversations with users in natural, intuitive ways, in part because they understand dialog context. To utilize dialog context, an automated assistant may preserve recent inputs from the user, questions that came from the user, and/or responses/questions provided by the automated assistant. For example, the user might ask, "Where is the closest coffee shop?", to which the automated assistant might reply, "Two blocks east." The user might then ask, "How late is it open?" By preserving at least some form of dialog context, the automated assistant is able to determine that the pronoun "it" refers to "coffee shop" (i.e., co-reference resolution).

In addition, in order to preserve user privacy and/or to conserve resources, a user must often explicitly invoke an automated assistant before the automated assistant will fully process spoken utterances. The explicit invocation of an automated assistant typically occurs in response to certain user interface input being received at a client device. The client device includes an assistant interface that provides, to a user of the client device, an interface for interfacing with the automated assistant (e.g., receives input from the user, and provides audible and/or graphical responses), and that interfaces with one or more additional components that implement the automated assistant (e.g., on-device component(s) and/or remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more particular spoken invocation phrases, which are also known as "hot-words/phrases" or "trigger words/phrases" (collectively referred to hereinafter as "hot-words"). For example, a particular spoken invocation phrase such as "Hey Assistant," "OK Assistant", and/or "Assistant" may be spoken to invoke an automated assistant. When an automated assistant is invoked using such user interface input(s), detected audio data is typically streamed from the client device to remote automated assistant component(s) that typically indiscriminately perform each of speech recognition, natural language understanding, and fulfillment. It has been found, however, that requiring explicit invocation prior to each spoken utterance is not as natural as human-to-human interactions, and leads to reduced user satisfaction.

SUMMARY

Techniques are described herein for selectively pre-empting the presentation of an automated assistant response in response to a hot-word free utterance that is received during the presentation and that is determined to be likely directed to the automated assistant. The determination that the utterance is likely directed to the automated assistant may be performed, for example, using an utterance classification operation that is performed on audio data received during presentation of the response, and based upon such a determination, the response may be pre-empted with another response associated with the later-received utterance. In addition, in some implementations, the duration that is used to determine when a session should be terminated at the conclusion of a conversation between a user and an automated assistant may be dynamically controlled based upon when the presentation of a response has completed.

Therefore, consistent with some implementations, a method may include, with an automated assistant device, monitoring an audio input during presentation of a first response to a first utterance, where monitoring the audio input includes generating audio data associated with a second, hot-word free utterance spoken during presentation of the first response; initiating an utterance classification operation for the audio data during presentation of the first response to determine if the second, hot-word free utterance is likely directed to the automated assistant device; in response to determining from the utterance classification operation that the second, hot-word free utterance is likely directed to the automated assistant device, initiating an utterance fulfillment operation to generate a second response for the second, hot-word free utterance; and pre-empting presentation of the first response on the automated assistant device with a presentation of the second response on the automated assistant device.

In some implementations, initiating the utterance classification operation includes providing the audio data to an utterance classification service that includes a neural network-based classifier trained to output an indication of whether a given utterance is likely directed to an automated assistant. Also, in some implementations, the utterance classification service is configured to obtain a transcription of the second, hot-word free utterance, generate a first, acoustic representation associated with the audio data, generate a second, semantic representation associated with the transcription, and provide the first and second representations to the neural network-based classifier to generate the indication. Further, in some implementations, the first and second representations respectively include first and second feature vectors, and the utterance classification service is configured to provide the first and second representations to the neural network based classifier by concatenating the first and second feature vectors.

In some implementations, the automated assistant device is a client device, and the utterance classification service is resident on the automated assistant device. In addition, in some implementations, the automated assistant device is a client device, and the utterance classification service is remote from and in communication with the automated assistant device. In some implementations, the automated assistant device is a client device, and initiating the utterance fulfillment operation includes processing the utterance fulfillment operation on the automated assistant device. In addition, in some implementations, the automated assistant device is a client device, and initiating the utterance fulfillment operation includes initiating the utterance fulfillment operation on a service that is remote from and in communication with the automated assistant device.

Moreover, in some implementations, the presentation of the first response includes playback of an audio response, and the method further includes performing acoustic echo cancellation on the audio data to filter at least a portion of the audio response from the audio data. Some implementations may also include performing speaker identification on the audio data to identify whether the second, hot-free utterance is associated with the same speaker as the first utterance. In addition, in some implementations, the second, hot-word free utterance is dependent upon the first utterance, and the method further includes propagating an updated client state for the automated assistant device in response to the first utterance prior to completing presentation of the first response such that generation of the second response is based upon the updated client state.

Some implementations may further include, after pre-empting presentation of the first response on the automated assistant device with the presentation of the second response on the automated assistant device, monitoring the audio input during presentation of the second response, dynamically controlling a monitoring duration during presentation of the second response, and automatically terminating an automated assistant session upon completion of the monitoring duration. In some implementations, dynamically controlling the monitoring duration includes automatically extending the monitoring duration for a second time period in response to determining after a first time period that the presentation of the second response is not complete. In addition, in some implementations, automatically extending the monitoring duration for the second time period includes determining the second time period based upon a duration calculated from completion of the presentation of the second response. Further, in some implementations, pre-empting the presentation of the first response on the automated assistant device with the presentation of the second response on the automated assistant device includes discontinuing the presentation of the first response. Some implementations may also include continuing the presentation of the first response after pre-empting the presentation of the first response.

Consistent with additional implementations, a method may be provided that includes, in response to an utterance received by an automated assistant device, communicating a response to the automated assistant device, including instructing the automated assistant device to initiate monitoring of an audio input for a first time period during presentation of the response by the automated assistant device; after the first time period and prior to completion of the presentation of the response by the automated assistant device, instructing the automated assistant device to initiate monitoring of the audio input for a second time period during presentation of the response by the automated assistant device; after the second time period and after completion of the presentation of the response by the automated assistant device, instructing the automated assistant device to initiate monitoring of the audio input for a third time period, including determining a duration of the third time period based upon a time at which the presentation of the response is completed by the automated assistant device; and automatically terminating an automated assistant session upon completion of the third time period.

In some implementations, the utterance is a hot-word free utterance, and the method further includes performing an utterance classification operation on the utterance to determine if the utterance is likely directed to the automated assistant device, where communicating the response to the automated assistant device is performed in response to determining from the utterance classification operation that the utterance is likely directed to the automated assistant device. Moreover, in some implementations, the utterance is a first utterance, and the method further includes, in response to a second utterance received by the automated assistant device during the second time period, determining that the second utterance is not directed to the automated assistant device, and where instructing the automated assistant device to initiate monitoring of the audio input for the third time period is performed only if the second utterance is received prior to completion of the presentation of the response by the automated assistant device.

In addition, some implementations may include a system including one or more processors and memory operably coupled with the one or more processors, where the memory stores instructions that, in response to execution of the instructions by one or more processors, cause the one or more processors to perform any of the aforementioned methods. Some implementations may include an automated assistant device including an audio input device and one or more processors coupled to the audio input device and executing locally stored instructions to cause the one or more processors to perform any of the aforementioned methods. Some implementations also include at least one non-transitory computer-readable medium including instructions that, in response to execution of the instructions by one or more processors, cause the one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
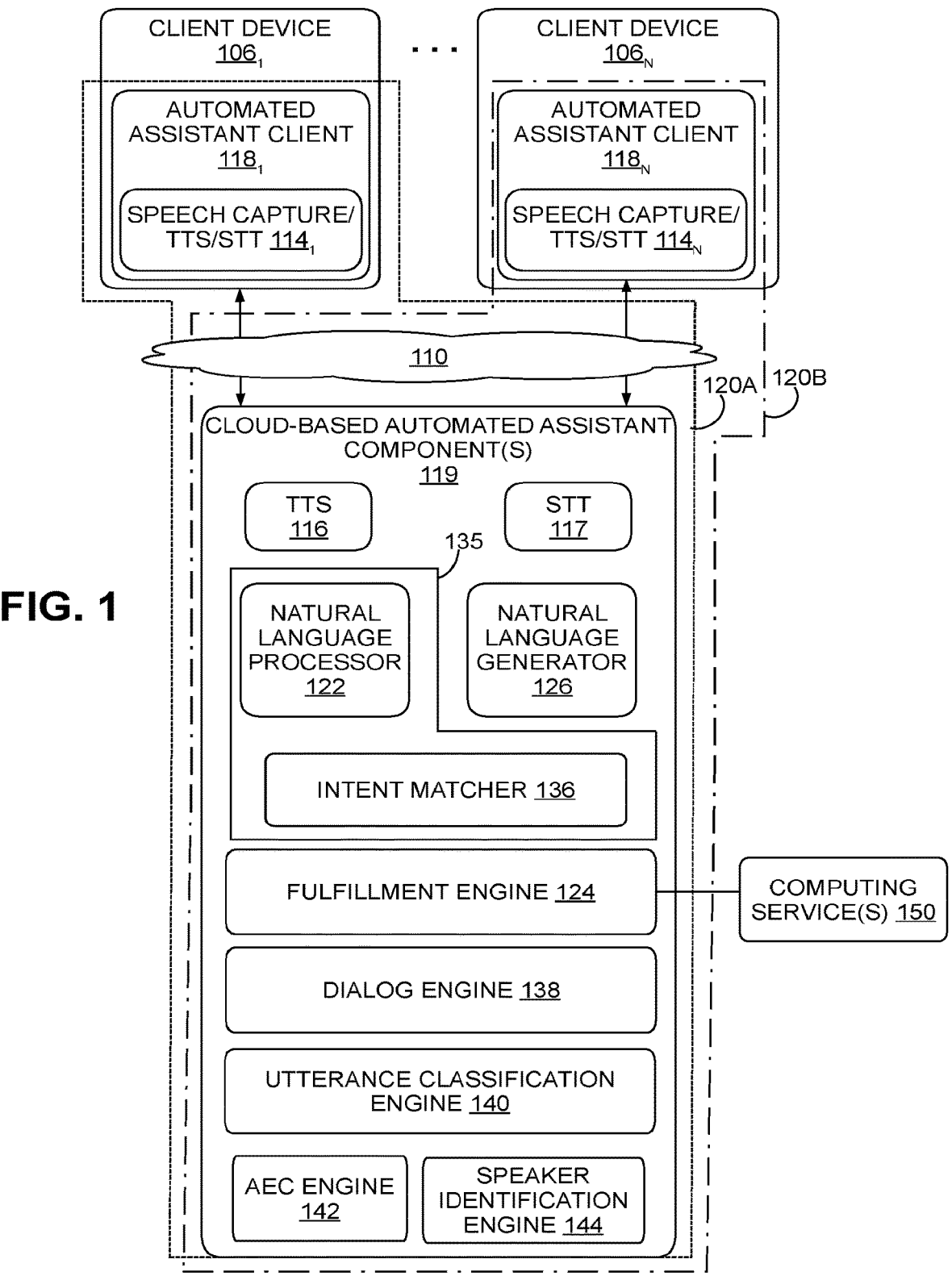
FIG. 1 is a block diagram of an example computing environment in which implementations disclosed herein may be implemented.

Now turning to FIG. 1, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language understanding engine 135, may be implemented on one or more computing systems (collectively referred to as a "cloud" computing system) that are communicatively coupled to client devices $106_{1-N}$ via one or more local and/or wide area networks (e.g., the Internet) indicated generally at 110.

In some implementations, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1. A first automated assistant 120A encompassed by a dashed line serves a first user (not depicted) operating first client device $106_1$ and includes automated assistant client $118_1$ and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119.

It thus should be understood that each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network. In various implementations, for example, some or all of the functionality of an automated assistant may be distributed between multiple computer systems, or even to a client computing device. In some implementations, for example, the functionality discussed herein with respect to detecting and processing utterances and generating and presenting responses thereto may be performed entirely within a client computing device, e.g., so that such functionality is available to a user even when no online connectivity exists. As such, in some implementations, an automated assistant device may include a client device, while in other implementations an automated assistant device may include one or more computer systems remote from a client device, or even a combination of a client device and one or more remote computer systems, whereby an automated assistant device is a distributed combination of devices. An automated assistant device may therefore in various implementations be considered to include any electronic device that implements any of the functionality of an automated assistant.

As noted above, in various implementations, each of the client computing devices $106_{1-N}$ may operate an automated assistant client 118. In various implementations, each automated assistant client 118 may include a corresponding speech capture/text-to-speech ("TTS")/speech-to-text ("STT") module 114. In other implementations, one or more aspects of speech capture/TTS/STT module 114 may be implemented separately from automated assistant client 118. In various implementations, speech capture/TTS/STT module 114 may generate speech recognition output based on a vocal query.

Each speech capture/TTS/STT module 114 may be configured to perform one or more functions: capture a user's speech, e.g., via a microphone; convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120—to text (or to other forms, such as lower dimensionality embeddings). Other speech input may be sent to cloud-based automated assistant components 119, which may include a cloud-based TTS module 116 and/or a cloud-based STT module 117.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language understanding engine 135, the aforementioned TTS module 116, the aforementioned STT module 117, and other components that are described in more detail below. In some implementations, one or more of the engines and/or modules of automated assistant 120 may be omitted, combined, and/or implemented in a component that is separate from automated assistant 120. In some implementations, to protect privacy, one or more of the components of automated assistant 120, such as natural language understand engine 135, speech capture/TTS/STT module 114, etc., may be implemented at least on part on client devices 106 (e.g., to the exclusion of the cloud).

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session.

As used herein, a "dialog session" may include a logically-self-contained exchange of one or more messages between a user and automated assistant 120. Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, change of input/output ("I/O") modalities employed by the user, and so forth.

Natural language processor 122 of natural language understanding engine 135 processes natural language input generated by users via client devices $106_{1-N}$ and may generate annotated output (e.g., in textual form) for use by one or more other components of automated assistant 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. Natural language processor 122 may also include a part of speech tagger configured to annotate terms with their grammatical roles and/or a dependency parser (not depicted) configured to determine syntactic relationships between terms in natural language input. In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In addition, in some implementations, the natural language processor 122 may additionally and/or alternatively include a coreference resolver (not depicted) configured to group, or "cluster," references to the same entity based on one or more contextual cues.

Natural language understanding engine 135 may also include an intent matcher 136 that is configured to determine, based on the annotated output of natural language processor 122, an intent of a user engaged in a human-to-computer dialog session with automated assistant 120. While depicted separately from natural language processor 122 in FIG. 1, in other implementations, intent matcher 136 may be an integral part of natural language processor 122 (or more generally, of a pipeline that includes natural language processor 122). In some implementations, natural language processor 122 and intent matcher 136 may collectively form the aforementioned "natural language understanding" engine 135.

Intent matcher 136 may use various techniques to determine an intent of the user. In some implementations, intent matcher 136 may have access to one or more databases that include, for instance, a plurality of mappings between grammars and responsive actions (or more generally, intents). Additionally or alternatively, in some implementations, one or more databases may store one or more machine learning models that are trained to generate output indicative of user intent, based on the user's input.

Grammars may be selected, formulated (e.g., by hand), and/or learned over time, e.g., to represent the most common intents of users. For example, one grammar, "play <artist>", may be mapped to an intent that invokes a responsive action that causes music by the <artist> to be played on the client device 106 operated by the user. Another grammar, "[weather|forecast] today," may be match-able to user queries such as "what's the weather today" and "what's the forecast for today?" As seen in the "play <artist>" example grammar, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?").

In contrast to many grammars (which may be created manually), machine learning models may be trained automatically, e.g., using logs of interactions between users and automated assistants. Machine learning models may take various forms, such as neural networks. They may be trained in various ways to predict user intent from user input. For example, in some implementations, training data may be provided that includes individual training examples. Each training example may include, for instance, free form input from a user (e.g., in textual or non-textual form) and may be labeled (e.g., by hand) with an intent. The training example may be applied as input across the machine learning model (e.g., a neural network) to generate output. The output may be compared to the label to determine an error. This error may be used to train the model, e.g., using techniques such as gradient descent (e.g., stochastic, batch, etc.) and/or back propagation to adjust weights associated with hidden layer(s) of the model. Once such a model is trained with a (usually large) number of training examples, it may be used to generate output that predicts intents from unlabeled free-form natural language inputs.

In some implementations, automated assistant 120 may facilitate (or "broker") the performance of actions by computing services 150 on behalf of users. The actions, which are generally a type of intent capable of being identified or determined by intent matcher 136, generally issue requests to computing services, and generally do so in connection with providing one or more parameters to the computing services to instruct such computing services on how to perform the actions.

A computing service, in this regard, may be considered to include practically any type of computer functionality capable of being invoked to perform some activity on behalf of a user. A computing service may be implemented by one or more processors and may be resident on the same computer system as an automated assistant, or may be resident on a different computer system from the computer system hosting an automated assistant. Some computing services may be accessible over a network (e.g., as is the case for cloud-based computing services), while other computing services may be resident on a user's client computing device. Some computing services may also be considered to be third party computing services that are associated with different parties from that of the automated assistant and the user, irrespective of where those computing services are hosted (e.g., on a third party computer system, on an automated assistant computer system, on a user computing device, in a cloud computing system, etc.). Services may also be resident on client devices, and the various engines and components illustrated in FIG. 1 may be considered to be computing services in some implementations.

A fulfillment engine 124 may be used in some implementations to receive the intent output by intent matcher 136, as well as any associated parameters (whether provided by the user proactively or solicited from the user) and fulfill the intent. In various implementations, fulfillment of the user's intent may cause various fulfillment information to be generated/obtained. The fulfillment information may in some implementations be provided to a natural language generator ("NLG") 126, which may generate natural language output based on the fulfillment information.

Fulfillment information may take various forms because an intent can be fulfilled in a variety of ways, e.g., based upon whether the intent is related to a search query, a request to perform a local or remote action, etc. Generally, fulfillment of an intent may result in the generation of a response, which may then be presented to the user, e.g., including an answer to a search query, a result of performing a local or remote action, etc. The presentation may include audio playback, e.g., a spoken and/or musical audio response, in some implementations, and in some implementations, the presentation may include visual information in lieu of or in addition to audio information, e.g., the presentation of text, images, animations and/or videos on a graphical display.

Additionally or alternatively, fulfillment engine 124 may be configured to receive, e.g., from natural language understanding engine 135, a user's intent and in turn utilize a dialog engine 138 to conduct a human-to-computer dialog session with the user to perform an action associated with the intent, e.g., by calling or invoking the performance of one or more operations by a computing service 150. Responsive actions may include, for instance, ordering a good/service, purchasing an event ticket, booking a reservation to a restaurant, hotel, airplane, train, ordering a taxi or rideshare care, starting a timer, setting a reminder, initiating a phone call, playing media, sending a message, etc. In some such implementations, fulfillment information may include parameters associated with the action, confirmation responses (which may be selected from predetermined responses in some cases), etc.

In addition, an utterance classification engine 140 may be used in some implementations to determine whether an utterance detected by the automated assistant is likely directed to the automated assistant. Specifically, an utterance generally refers to a spoken input generated by a user and detected by an automated assistant, and it will be appreciated that in some instances, user utterances detected by an automated assistant will not be directed to the automated assistant, e.g., if a user is speaking to another individual on a call or in person, if a user is speaking to himself or herself, etc. An utterance classification engine 140 may thus be used to determine whether an utterance that has been detected by the automated assistant is likely intended by the user to be processed by the automated assistant.

Figure 2:
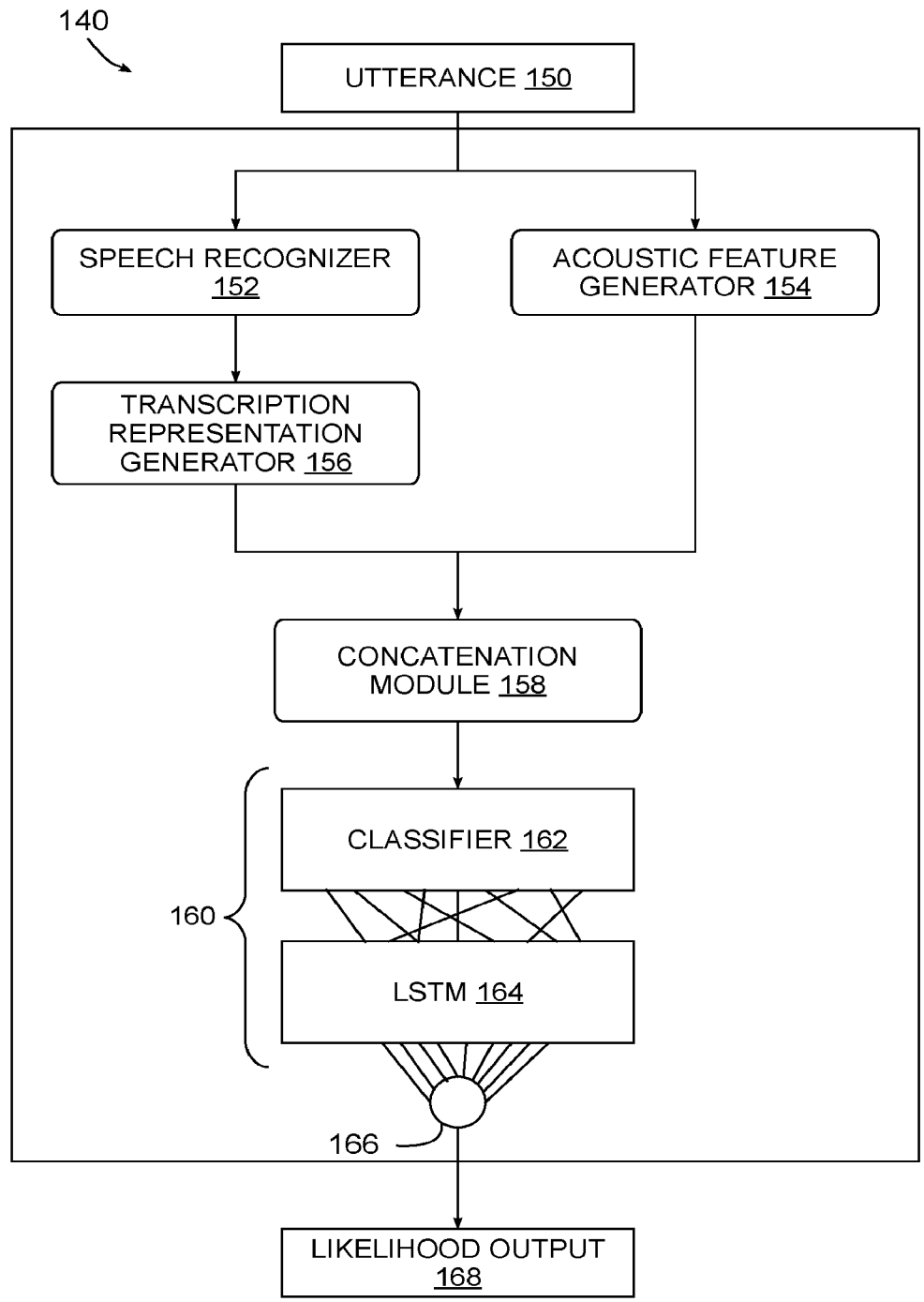
FIG. 2 is a block diagram of an example implementation of the utterance classification engine referenced in FIG. 1.

In some implementations, for example, utterance classification engine 140 may be implemented as a computing service including a neural network-based classifier trained to output an indication of whether a given utterance is likely directed to an automated assistant. FIG. 2, for example, illustrates an example implementation of utterance classification engine 140 that may be implemented, for example, in a client device 106. Implementation of all or a portion of this implementation within a cloud-based component would be readily apparent to one of ordinary skill having the benefit of the instant disclosure.

As illustrated, an audio input comprising an utterance 150 may be provided to both a speech recognizer 152 and an acoustic feature generator 154, with the former used to generate semantic information and the latter use to generate acoustic information associated with an utterance reflected in utterance 150. Speech recognizer 152 may be a device including a combination of hardware, software, and firmware configured to identify words and phrases in a spoken language. In some implementations, the speech recognizer 152 converts the obtained utterance 150 to a machine-readable format. The machine-readable format may include one or more words in a sentence-structured format that represents the obtained utterance 150. In some implementations, the speech recognizer 152 may use various combinations of methodologies to perform speech recognition. For example, the speech recognizer 152 may include a Hidden Markov model approach, dynamic time warping (DTW)-based, neural networks, a deep feedforward and recurrent neural network approach, or some combination of the various approaches. The utterance classification engine 140 may provide the output of the speech recognizer 152 to a transcription representation generator 156. Simultaneously, the utterance classification engine 140 may provide the obtained utterance 150 to an acoustic feature generator 154.

In some implementations, the acoustic feature generator 154 may be a device including a combination of hardware, software, and firmware configured to extract feature vectors from the obtained utterance 150 and provide the extracted feature vectors as input to the recurrent neural network elements. The acoustic feature generator 154 may analyze different segments or analysis windows of the obtained utterance 150. In some implementations, a feature vector, or a set of acoustic feature vectors, may be determined for each frame of the obtained utterance 150. For example, the acoustic feature generator may perform a Fast Fourier Transform (FFT) on the audio in each window; map the powers of the spectrum using a mel-frequency scale; take the logarithms of the powers at each mel-frequency; take the discrete cosine transform of the list of mel log powers; and, analyze the amplitude content of the features to determine the acoustic features for each window. The acoustic features may be mel-frequency cepstral coefficients (MFCCs), the features determined using a perceptual linear prediction (PLP) transform, or features determined using other techniques.

The utterance classification engine 140 may provide the feature vectors one at a time to the recurrent neural network elements in the acoustic feature generator 154. The recurrent neural network elements may be one or more long short-term memory (LSTM) layers. The acoustic feature generator 154 may be a deep-layered LSTM neural network architecture built by stacking multiple LSTM layers. The utterance classification engine 140 may train the neural network in the acoustic feature generator 154 to provide an output of a fixed-size speech unit representation or an embedding. For example, the embedding may be a 64-unit vector. In some implementations, the units may be bits or bytes. One embedding is output for each feature vector.

In some implementations, the utterance classification engine 140 includes the acoustic feature generator 154 along with the speech recognizer 152 to enhance the recognition of the context of the obtained utterance 150. By enabling an acoustic feature generator 154 in the utterance classification engine 140, the utterance classification engine 140 may reduce the failure cases of misrecognitions. In addition, people's utterances include distinctive acoustic elements not captured by the text of the utterance. For example, acoustic elements may include characteristics such as pitch, speech tempo, and accent, to name a few. By including the acoustic feature generator 154, the distinctive acoustic elements may assist in determining whether the audience for the utterance is likely directed towards the automated assistant server 116.

The transcription representation generator 156 may include one or more neural network layers. For example, the transcription representation generator 156 may include a convolutional neural network (CNN) word-embedding model. Like the acoustic feature generator 154, the transcription representation generator 156 may include one or more LSTM layers and may be a deep LSTM neural network architecture build by stacking multiple LSTM layers. In addition, the utterance classification engine 140 may train the neural network in the transcription representation generator 156 to provide output of a transcription of the obtained utterance 150. In some implementations, the transcription of the utterance includes fixed-size text unit representations or embeddings. For example, each embedding output may be a 100-unit vector. In some implementations, the units may be floating point or integer values. One embedding output from the transcription representation generator 156 for each word of the sentence. The transcription includes each of the embedding units provided as output.

In some implementations, the utterance classification engine 140 may provide input that includes the sentence produced by the speech recognizer 152 to the transcription representation generator 156. The utterance classification engine 140 may input one word at a time from the sentence into the CNN word-embedding model of the transcription representation generator 156. In addition, the CNN word-embedding model may max pool the sentence data provided to the CNN word-embedding model to decrease the input data in order to reduce the computational complexity of the network.

In order for the utterance classification engine 140 to optimize the probability that the obtained utterance 150 is directed towards the automated assistant server 116, the utterance classification engine 140 may utilize both outputs of the transcription representation generator 156 and the acoustic feature generator 154. The concatenation module 158 may be a device in software, hardware, firmware, or a combination of each that combines the embedding output from the transcription representation generator 156 and the embedding output from the acoustic feature generator 154. For example, the concatenation module 158 may combine the 100-unit vector output from the transcription representation generator 156 and the 64-unit vector output from the acoustic feature generator 154 output to create a 164-unit vector output.

In some implementations, the concatenation module 158 may create a matrix of 164-unit vector outputs. For example, the matrix may include one or more columns of 164-unit vectors. This concatenation module 158 may convert the 100-unit embeddings to a semantically meaningful vector that include one or more numbers. The concatenation module 158 may convert the 100-unit embeddings to the semantically meaningful vector that includes one or more numbers using one or more functional calls in a programming language, such as word2vec or GloVe.

In the illustrated example, the concatenation module 158 may generate a matrix of the numeric vectors from the transcription representation generator 158 and a matrix of embeddings from the acoustic feature generator 154. In particular, given a 10-word sentence where each word is associated with a 100-unit embedding, the concatenation module 158 may create a 10×100 matrix and concatenate that with the matrix from the acoustic feature generator 154. In the same example, the matrix from the acoustic feature generator 154 may include 10 feature vectors that each includes a 64-unit embedding. The concatenation module 158 may create a 10×64 matrix to concatenate with a 10×100 matrix from the transcription representation generator 156. The resultant matrix created by the concatenation module 158 may be 10×164.

One benefit of producing a matrix for the acoustic features of the utterance 150 and a matrix for the textual features of the utterance 150 is that the dimensions for each respective matrix is such that they may be combined into a proper matrix. For example, each matrix includes the same number of rows, which allow for a horizontal concatenation. Assuming the number of columns between respective matrices is similar, the concatenation module 158 would create a vertical concatenation. In some implementations, the concatenation module 158 may provide the concatenated matrix to the neural network 160.

In some implementations, the concatenation module 158 may buffer the number of 164-unit vectors in the matrix until the neural network 160 has processed one 164-unit vector. Once the neural network 160 processes one 164-unit vector, the concatenation module 158 may provide the next 164-unit vector into the neural network 160. The speech recognizer 152, the acoustic feature generator 154, the transcription representation generator 156, and the concatenation module 158 may create 164-unit vectors faster than the neural network 160 may process one 164-unit vector. Therefore, the concatenation module 158 creates a matrix buffer of 164-unit vectors to store and ready to be processed.

In some implementations, utterance classification engine 140 includes a neural network 160 to process the concatenated matrix. In particular, the neural network 160 may include a classifier 162 and another LSTM 164. The utterance classification engine 140 may train the classifier 162 and the LSTM 164 to produce an output that indicates a likelihood that the audience for the obtained utterance 150 is likely directed towards the automated assistant. In some implementations, the classifier 162 and the LSTM 164 may be trained using examples of queries previously spoken by users and recorded dialog not directed towards an automated assistant. For example, the utterance classification engine 140 may retrieve multiple phrases spoken and in text format not directed towards an automated assistant.

In some implementations, the utterance classification engine 140 may retrieve other phrases from one or more databases across the internet that include phrases not directed towards an automated assistant server 116. For example, one of the phrases may include "Bob said, what's the temperature outside, and I shook" or "What time are your parents coming over?" Generally, the audience for these types of questions is another individual in the room, even though the utterance classification engine 140 may interpret the audience to be likely directed towards an automated assistant for these types of questions. However, these types of questions are some of the optimal phrases to use for training the neural network 160. The classifier 162 may learn to identify phrases that closely identify and seem to include an audience likely directed towards an automated assistant, yet are actually background noises, or directed towards other individuals in a room. Such examples include, "What time are your parents coming over," "How much do you weigh," or "What did you buy at the grocery store?" Each of these questions do not include an identifier indicating who the speaker is talking to but do include a pronoun that may indicate to the classifier 162 to look away when identifying phrases not directed towards an automated assistant.

In some implementations, the utterance classification engine 140 updates the weights of the classifier 162 and the weights of the LSTM 164 during training. For example, the utterance classification engine 140 may update the weights of the classifier 162 and the LSTM 164 using back-propagation of errors through time with stochastic gradient descent.

In some implementations, the output of the classifier 162 and the LSTM 164 may include an indication that the audience for the obtained utterance 150 was likely directed towards an automated assistant. For example, the indication may include a probability that the output of the 164-unit vector indicates the audience for the obtained utterance is likely directed towards an automated assistant. In other implementations, the output of the classifier 162 and the LSTM 210B collectively may include a score ranging from 0 to 100.

In some implementations, a sigma 166 sums each of the outputs provided by the LSTM 164. For example, the sigma 166 may receive output probabilities or output scores for each of the 164-unit vectors for each utterance that propagates through the neural network 160. The sigma 164 may cumulatively sum each output probability or score from the neural network 160 for the entire obtained utterance 150.

In some implementations, the sigma 166 compares the final output probability or score to a predetermined threshold. If the sigma 166 determines the final output probability or score exceeds the predetermined threshold, then a likelihood output 168 indicates a likelihood that the audience for the obtained utterance 150 is directed towards an automated assistant. Alternatively, the likelihood output 168 may indicate a likelihood that the audience for the obtained utterance 150 is not directed towards an automated assistant if the final output probability or score is below the predetermined threshold. For example, the predetermined threshold may be a probability of 50% or a score of 50/100.

In some implementations, the utterance classification engine 140 may determine from the likelihood output 168 whether to provide the obtained utterance 150 to an automated assistant. For example, should the utterance classification engine 140 determine that the final output probability or score exceeds the predetermined threshold, the utterance classification engine 140 may generate instructions to provide to an automated assistant to initiate processing of the obtained utterance 150. Alternatively, the utterance classification engine 140 may determine the final output probability or score does not exceed the predetermined threshold. In response, the utterance classification engine 140 may delete the obtained utterance 150 from memory and proceed to wait until a new obtained utterance. In other implementations, the utterance classification engine 140 may generate instructions for an automated assistant indicating to not process the obtained utterance 150. In addition, the instructions may convey to the automated assistant to store the obtained utterance 150 in the database of stored utterances not directed towards the automated assistant.

As such, in some implementations, a classifier may be configured to utilize both acoustic and sematic information, and may utilize both an acoustic representation of audio data associated with an utterance and a semantic representation of a transcript generated from the audio data associated with the utterance as inputs in order to determine the likelihood of an utterance being directed to an automated assistant. In some implementations, these representations may be encoded into individual feature vectors, and in some implementations, these feature vectors may be concatenated when being input to the classifier.

In some implementations, utterance classification engine 140 may be used to detect utterances that contain hot-words (alternatively referred to as trigger words), which may be individual words or phrases, and which may be used to explicitly convey that a particular utterance is directed to an automated assistant. To preserve user privacy and/or to conserve resources, for example, it may be desirable in some implementations to require a user to explicitly invoke an automated assistant before the automated assistant will fully process an utterance. The explicit invocation of an automated assistant typically occurs in response to certain user interface input being received at a client device. The client device may include an assistant interface that may provide, to a user of the client device, an interface for interfacing with the automated assistant (e.g., receives input from the user, and may provide audible and/or graphical responses), and that interfaces with one or more additional components that implement the automated assistant (e.g., on-device component(s) and/or remote server device(s) that process user inputs and generate appropriate responses). Some user interface inputs that may invoke an automated assistant via a client device include a hardware and/or virtual button at the client device for invoking the automated assistant (e.g., a tap of a hardware button, a selection of a graphical interface element displayed by the client device). Other automated assistants, however, may additionally or alternatively be invoked in response to one or more hot-words. For example, a particular spoken invocation phrase such as "Hey Assistant," "OK Assistant", and/or "Assistant" may be spoken to invoke an automated assistant.

However, in some implementations, the utterance classification engine may be used to detect utterances that do not contain any specific hot-words, which are referred to herein as hot-word free utterances, and from which the utterance classification engine may attempt to identify as being directed to the automated assistant. Utterances directed to and/or spoken by other individuals, utterances broadcast over a television, speaker or other playback device, or other types of background noise, for example, may not be directed to an automated assistant, and as such, it is desirable for the utterance classification engine to assess any audio data identified as a potential utterance to determine if the utterance is likely directed to the automated assistant prior to allowing the automated assistant to generate a response to the utterance. Hot-word free utterances may be used in some implementations to initiate automated assistant sessions (i.e., some hot-word free utterances may be used as the first utterance in a dialog with an automated assistant), while in other implementations a hot-word or other trigger may be required in order to initiate an automated assistant session, with subsequent utterances capable of being processed regardless of whether or not they are hot-word free.

Returning to FIG. 1, various additional components may be used in some implementations to facilitate detection of an utterance and/or utterance classification. Acoustic Echo Cancellation (AEC) engine 142, for example, may be used in some implementations to cancel out audio information from an automated assistant presentation, e.g., spoken audio played back by a client device as a response to a user query. In addition, in lieu of or in addition to AEC engine 142, a speaker identification engine 144 may be used to identify a speaker of a particular utterance, e.g., such that when multiple individuals are speaking at a given location, only the utterances of a particular individual will be processed, and the utterances of other individuals will be ignored. Thus, in some implementations, the playback of audio generated by an automated assistant and/or the voices of other individuals may be effectively filtered out so that only the utterances of a particular individual are processed and responded to by an automated assistant. In other implementations, however, engines 142 and 144 may be omitted.

Further, in still other implementations, one or both of engines 142, 144 may be resident on a client device, e.g., so that only audio data associated with a particular speaker is communicated from the client device to the cloud-based automated assistant components.

Figure 3:
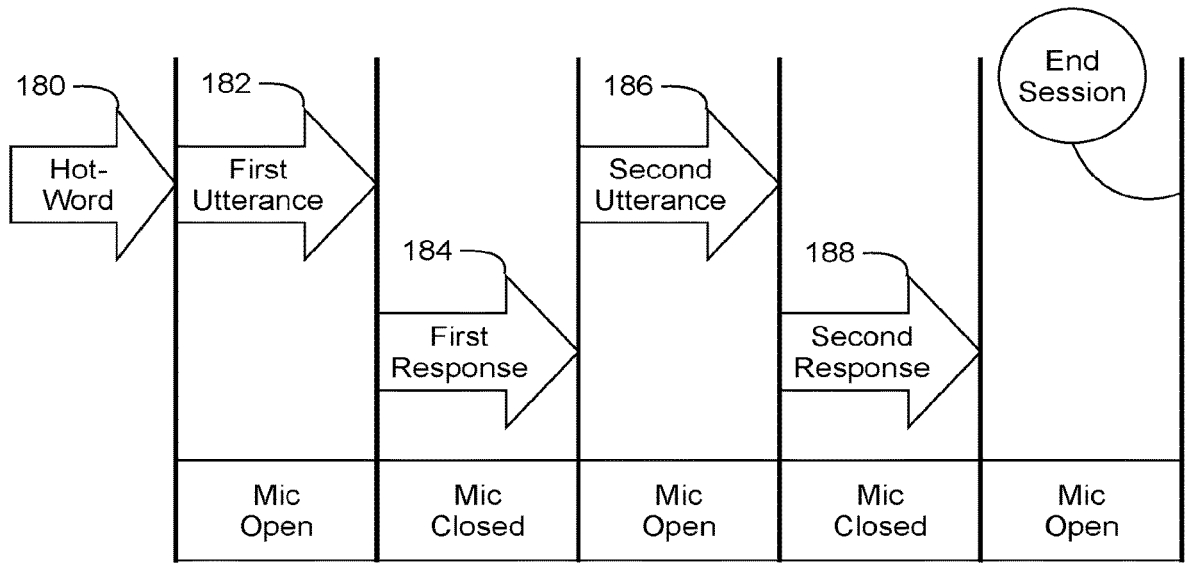
FIG. 3 illustrates an example conversation conducted between a user and an automated assistant that employs silence-based endpointing.
Figure 4:
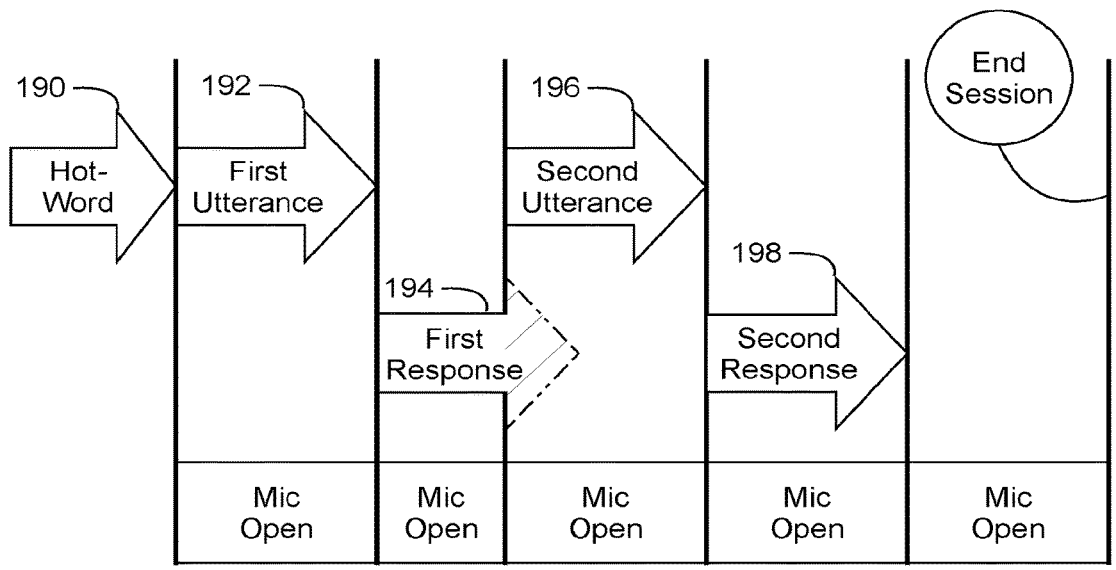
FIG. 4 illustrates an example conversation similar to that illustrated in FIG. 3, but additionally utilizing hot-word free pre-emption, in accordance with various implementations.

Now turning to FIGS. 3 and 4, in some implementations, utterance classification may be used in some instances to facilitate more natural and more efficient interactions with an automated assistant, in part by eliminating the need for hot-word or other explicit invocation of an automated assistant in order to process a spoken utterance issued during presentation of a response to a prior utterance. Some automated assistants, for example, utilize silence-based endpointers that turn conversations into turn-based dialogues, with a user in one turn issuing an utterance and an automated assistant presenting a response to the utterance in a subsequent turn, and with subsequent turns initiated whenever a user issues another utterance within a predetermined time after an automated assistant completes presentation of its response.

Generally, with automated assistants incorporating silence-based endpointing, a session is initiated in response to an explicit invocation of the automated assistant via a hot-word or other user action, and once a user completes his or her spoken utterance, the automated assistant takes a turn and presents a response to the utterance. Upon completion of the presentation, any follow-up utterances generally must be spoken within a predetermined time period (which may be referred to herein as a "mic-open" period since any utterances received during that period will generally be captured and processed by the automated assistant). An utterance received during the mic-open period will initiate a new response presentation by the automated assistant, while the lack of an utterance during the open period will generally represent the end of a conversation, thereby closing the session between the user and the automated assistant. Notably, during the periods in which responses are presented by the automated assistant, any user input may be ignored (i.e., these periods may be considered to be "mic-closed" periods since any utterances received during such periods will generally be ignored).

FIG. 3, for example, illustrates an example conversation conducted between a user and an automated assistant that employs silence-based endpointing. After a hot-word (arrow 180) is used to invoke an automated assistant, a user and automated assistant alternate between issuing utterances (arrows 182, 186) and presenting responses to those utterances (arrows 184, 188), with alternating mic-open and mic-closed periods occurring during which spoken utterances are either processed (mic-open) or ignored (mic-closed), and with a session terminating once no new utterance is received within a particular mic-open period.

In various implementations disclosed herein, however, utterance classification may be used to facilitate more natural and more efficient interactions with an automated assistant, in part by eliminating the need for hot-word or other explicit invocation of an automated assistant in order to process a spoken utterance issued during presentation of a response to a prior utterance. As illustrated in FIG. 4, in particular, after a hot-word (arrow 190) is spoken, a second utterance (arrow 196) is issued during presentation of a first response (arrow 194) to a first utterance (arrow 192), effectively pre-empting the presentation of the first response, and initiating a second response (arrow 198) to the second utterance without requiring completion of the first response. Furthermore, as noted in FIG. 4, during presentation of each response, user input is still detected and processed, i.e., such that even during response presentation, the automated assistant is considered to be in a "mic-open" period.

It will be appreciated that in some implementations and/or instances, pre-emption of the first response may result in an interruption to, or a discontinuation of, the presentation of the first response. In other implementations and/or instances, however, pre-emption of the first response may not result in the presentation of the first response being discontinued, but may instead result in the presentation of the first response being paused, temporarily silenced, or temporarily lowered in volume, and potentially with a presentation of a second response overlapping the continued presentation of the first response. Further, in some instances, the pre-emption may result in no perceptible change to the presentation of the first response from the perspective of the user. Particularly where a second utterance includes a request to refine or modify a prior request, it may be desirable to continue the presentation of the first response, but modified in some manner to address the request associated with the second utterance. Thus, for example, if a first utterance includes a request to play music, a second utterance such as "louder please" may result in the volume of the music playback being increased, but without pausing or stopping the playback.

Figure 5:
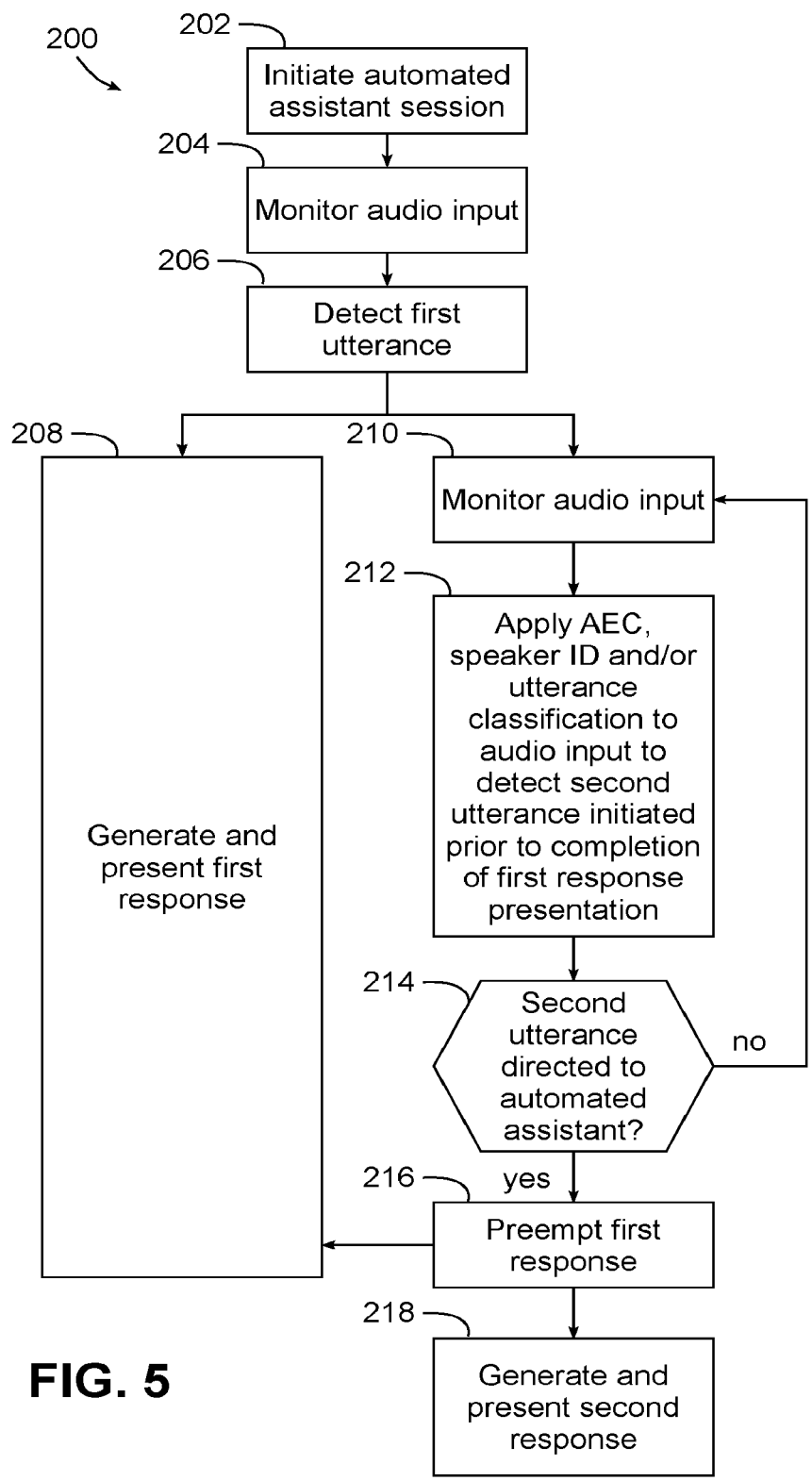
FIG. 5 is a flowchart illustrating an example sequence of operations for conducting an automated assistant session, in accordance with various implementations.

FIG. 5, for example, illustrates a sequence of operations 200 for conducting a conversation between a user and an automated assistant consistent with some implementations. In an example conversation, an automated assistant session may be initiated (block 202), e.g., in response to utterance of a hot-word by a user, or by other suitable explicit actions such as pressing a soft or hard button on an electronic device. In other implementations, a session may also be initiated without explicit invocation by a user.

Next, an automated assistant device may monitor an audio input such as an input received from one or more microphones and may detect a first utterance as a result thereof (block 204). Then, as illustrated in FIG. 5, a first utterance fulfillment operation may be performed to generate and present a first response to the first utterance to a user (block 208). The fulfillment, generation and presentation may be performed locally in the automated assistant device, remotely from the automated assistant device (e.g., using cloud-based assistant functionality), or using a combination of local and remote devices. Concurrently with such presentation, however, the audio input may continue to be monitored (block 210), and one or more of AEC, speaker identification and/or utterance classification may be performed to attempt to detect a second utterance by a user prior to completing presentation of the first response (block 212). In the illustrated implementation, the second utterance may be hot-word free, and as such monitoring of the audio input may include generating audio data associated with the second, hot-word free utterance spoken during presentation of the first response.

Given that an utterance spoken during presentation of the first response may not be directed to the automated assistant, however, it may be desirable to perform an utterance classification operation on the audio data associated with the second utterance in some implementations to determine if the second, hot-word free utterance is likely directed to the automated assistant device (block 214). Also, as noted above, AEC may be performed in some implementations to filter out the playback of the response by the client device and/or speaker identification may be performed to restrict a conversation to a single user. The second utterance, for example, may be directed at another individual in the area or at no one in particular, may be spoken by a different individual or may be background noise in some instances, so utterance classification may be used to identify those utterances that are directed at the automated assistant and potentially relevant to the ongoing conversation. If not, control returns to continue monitoring of the audio input to potentially detect other utterances (block 210). Otherwise, if the utterance classification operation determines that the second, hot-word free utterance is likely directed to the automated assistant device, presentation of the first response on the automated assistant device may be pre-empted (block 216) and a second utterance fulfillment operation may be initiated to generate and present a second response for the second, hot-word free utterance (block 218).

Various types of utterances, requests or conversations may utilize the herein-described techniques in various implementations. For example, media queries and/or control requests may implement the herein-described techniques, e.g., to permit a user to effectively interrupt a response to a first utterance to clarify the first utterance. An example conversation might include "user: OK assistant, play Happy Birthday; assistant: now playing Happy Birthday by Artist A . . . ; user: no, I meant the version by Artist B; assistant: OK, now playing Happy Birthday by Artist B . . . " The herein-described techniques may also be used in connection with smart home device control, setting reminders, appointments, alarms or timers, interacting with a shopping list, controlling a device, or making general information queries As noted above, it may be desirable in some implementations to utilize silence-based endpointing in connection with conducting a session with an automated assistant. However, the invention is not so limited, and other mechanisms may be used. For example, in some implementations, longform recognition, whereby automated speech recognition is run continuously to attempt to detect utterances, may be used.

Where silence-based endpointing is used, however, it may also be desirable to dynamically control a monitoring duration and thus when a session is terminated as a result of reaching a silence-based endpoint. In particular, it may be desirable in some implementations to provide a predetermined period of time after a response presentation is complete to wait for a subsequent utterance, after which point a session is terminated if no utterance is received. In some implementations, particularly those in which an audible response is presented on a device that is in communication with a cloud-based service, calculation of the duration of a response may be complicated by the fact that a device may use different languages or voices to synthesize speech and/or due to the fact that text to speech (US) data may be streamed over the course of multiple communications to a client, such that a cloud-based service may have difficulty predicting the end of a response presented by a remote device.

In addition, it may also be desirable to implement early device state propagation in such environments to avoid race conditions in which subsequent utterance fulfillment operations may attempt to update a client's state prior to that state being updated as a result of a prior utterance fulfillment operation. Such early propagation may be useful, in particular, in environments where a client device is capable of locally fulfilling some types of requests, such that if client state information is not updated by a cloud-based server until the end of a session, a follow-up utterance processed by the cloud-based server would not have a current client state upon which to operate when attempting to process the follow-up utterance.

Figure 6:
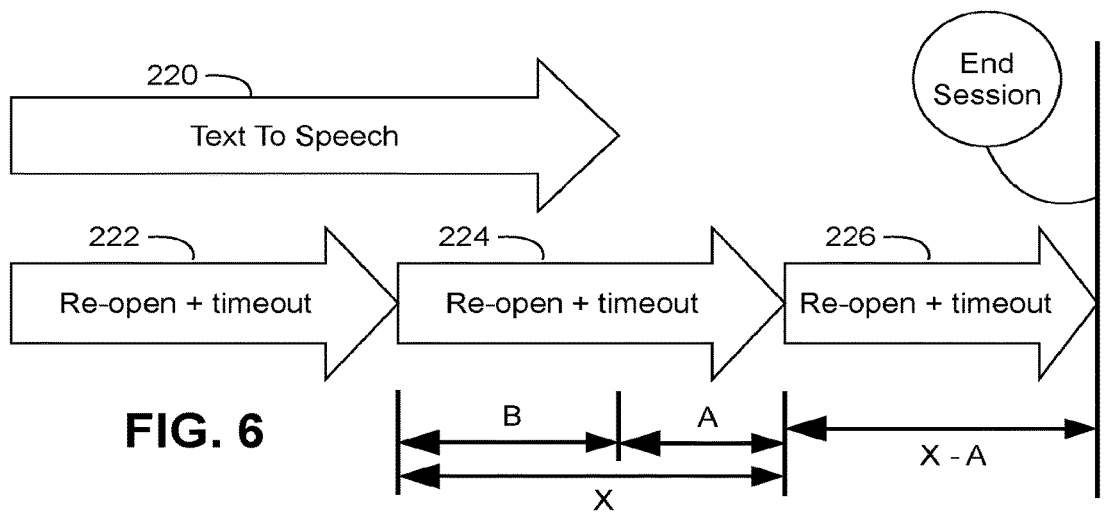
FIG. 6 illustrates an example conversation between a user and an automated assistant that incorporates a dynamically-controlled monitoring duration, in accordance with various implementations.

FIG. 6, for example, illustrates an example conversation conducted between a user and an automated assistant that employs a dynamically-controlled monitoring duration that may be used in some implementations. In this implementation, and in response to an utterance received by an automated assistant device, a response is communicated to a client device, as well as an instruction to initiate monitoring of an audio input for a first time period during presentation of the response by the client device. Then, after the first time period and prior to completion of the presentation of the response by the client device, the client device may be instructed to initiate monitoring of the audio input for a second time period during presentation of the response. Then, after the second time period and after completion of the presentation of the response by the client device, the client device may be instructed to initiate monitoring of the audio input for a third time period. Moreover, in some instances, the duration of the third time period may be determined based upon a time at which the presentation of the response is completed by the client device, e.g., to maintain a relatively constant timeout duration from the end of the presentation to the end of a session.

FIG. 6 in particular illustrates that during playback of a text to speech response presentation (arrow 220), a cloud-based assistant component may periodically communicate a "re-open mic" message to a client device (arrows 222, 224, 226), providing a timeout duration with each message, and effectively re-issuing the message at the end of each timeout duration so long as presentation of the response has not yet completed. Thus, at the completion of the duration for the first re-open mic message (arrow 222), a second re-open mic message (arrow 224) is issued due to the fact that the text to speech response presentation is still ongoing. At the completion of the second re-open mic message duration, however, text to speech response presentation has already completed, so one additional re-open mic message (arrow 226) may be issued to provide an overall duration from the end of the text to speech response presentation that is at least the desired duration to control termination of the session. Moreover, in some implementations it may be desirable to specify a duration in the last message based upon the time at which the presentation of the response completed such that a consistent timeout duration is achieved regardless of when a response presentation completes relative to any open mic period. In other implementations, however, a different combined duration may be used (e.g., greater than or less than the default duration for each message), while in still other implementations, no adjustment of the duration may be performed.

Specifically, assuming, for example, that it is desirable to utilize the same duration X for each re-open mic message and for terminating a session, FIG. 6 illustrates a duration A that represents the remaining portion of the duration X associated with the second message, while B represents the portion of the presentation response that overlapped the duration X associated with the second message. In some implementations therefore it may be desirable to specify a duration in the third message 226 substantially equal to X-A such that the combined duration from the end of the response presentation is substantially equal to X.

Figure 7:
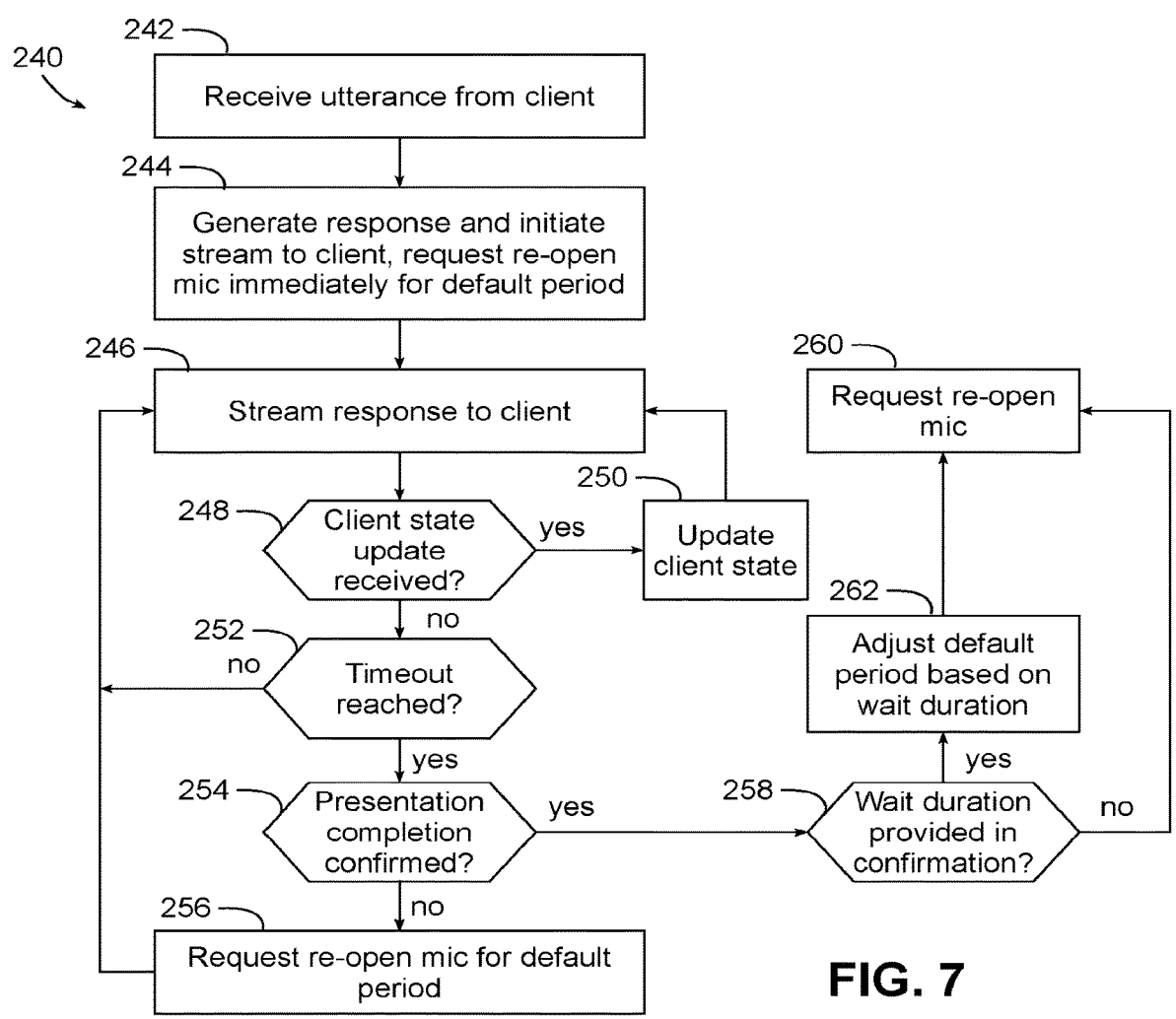
FIG. 7 is a flowchart illustrating an example sequence of operations for dynamically controlling a monitoring duration, in accordance with various implementations.

FIG. 7 illustrates an example sequence of operations 240 performed by a cloud-based service to interact with a client device and dynamically control a timeout duration consistent with some implementations. Sequence 240 may be implemented, for example, using one or more processors and using one or more of the various components illustrated in FIG. 1. Sequence 240 may also be used to propagate client state to a cloud-based service as will be described further herein.

In particular, an utterance may be received from a client device (block 242) and a response may be generated and streamed to the client device (block 244). Further, at this time an immediate re-opening of the mic may be requested for a predetermined duration or period, e.g., a default period. Streaming of the response to the client may then proceed (block 246). During streaming, the cloud-based server may be responsive to various messages from the client, and the cloud-based service may further monitor the timeout duration for the session. For example, the cloud-based service may monitor for receipt of a client state update (block 248), which may cause the client state to be updated on the cloud-based service so that any additional utterances received during or after the response presentation is complete may be fulfilled based upon the current state of the client. Such functionality may be useful, in particular, when any subsequent utterance is dependent upon the initial utterance (e.g., in terms of being dependent upon a state that is updated by the initial utterance), such that propagation of the updated client state prior to completing presentation of the response enables the generation of any response to a subsequent utterance to be based upon the updated client state.

In addition, the cloud-based service may monitor for reaching end of the timeout duration (block 252). If the timeout is reached, the cloud-based service may determine whether completion of the response presentation has been confirmed (block 254), e.g., as a result of receiving a message from the client device indicating that it has completed the presentation. If not, a new request may be issued to re-open the mic for another default period (block 256) and streaming of the response proceeds accordingly.

Returning to block 254, if completion of the presentation is confirmed, a determination may be made as to whether a wait duration has been provided in a communication from the client device (block 256). In such a communication, for example, the client device may provide an indication of the duration or amount of time that the client device has already waited for a response since the completion of the presentation (corresponding to duration A of FIG. 6). Alternatively, the client device may provide an indication of the duration or amount of time that the presentation overlapped the prior default period (corresponding to duration B of FIG. 6). Still alternatively, the client device may provide a time stamp representing when the presentation completed such that one or more of durations A or B may be determined therefrom. It will also be appreciated that communication costs may also be factored into a duration calculation to account for the time required to communicate messages between the cloud-based service and the client device.

If the client device did not provide any of such information, another re-open mic request may be issued using the default period (block 260), after which either another utterance is detected or the session ends. If, however, the client device did provide any such information, the default period may first be adjusted (block 262), e.g., to account for the amount of time since the presentation completed, such that the duration specified in the message provides a combined duration that is substantially equal to the default period.

Figure 8:
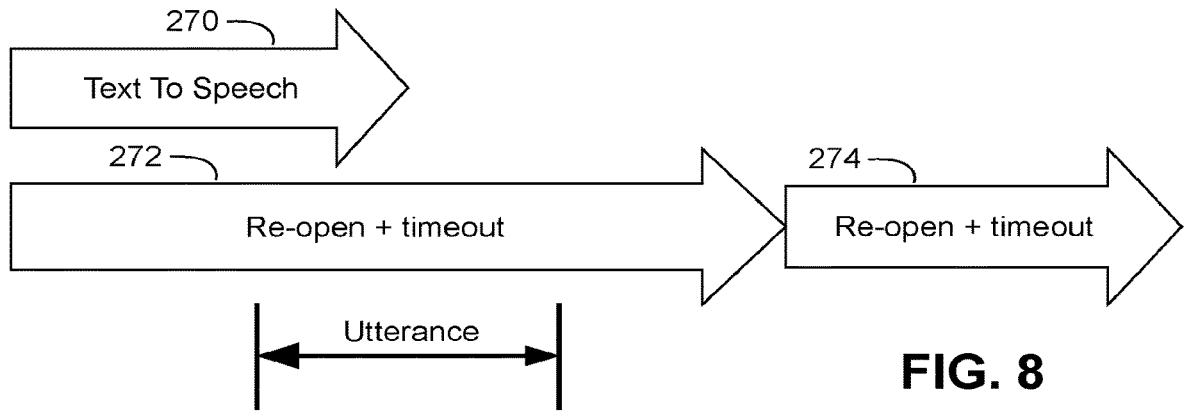
FIG. 8 and FIG. 9 illustrate another example conversation between a user and an automated assistant that incorporates a dynamically-controlled monitoring duration, in accordance with various implementations.
Figure 9:
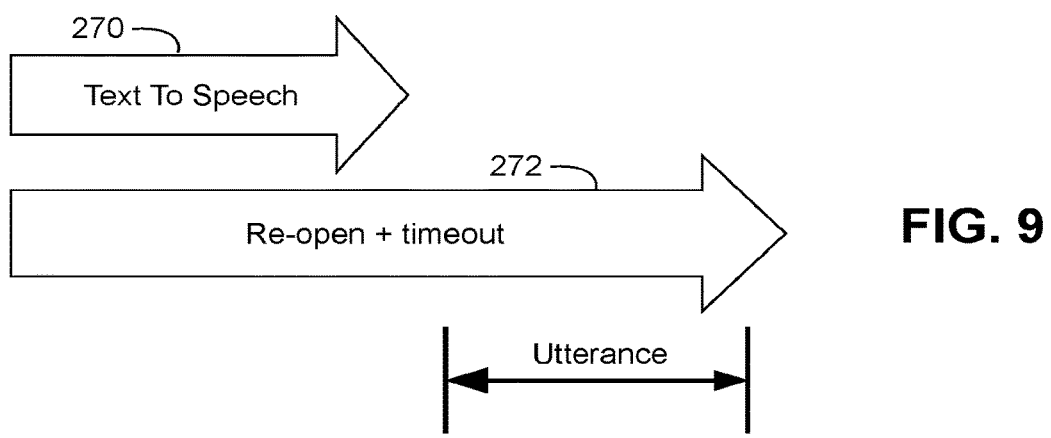
Figure 10:
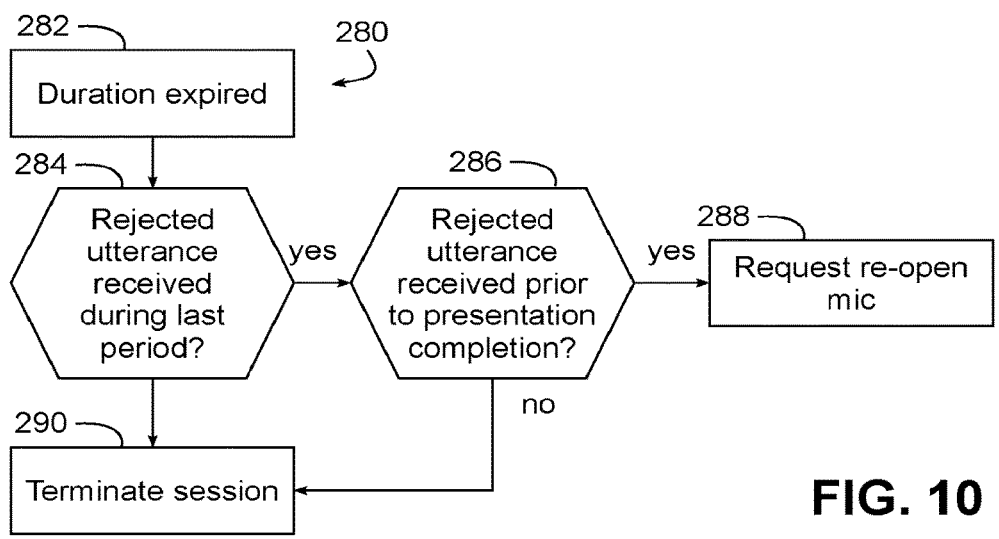
FIG. 10 is a flowchart illustrating another example sequence of operations for dynamically controlling a monitoring duration, in accordance with various implementations.

It may also be desirable in some implementations to control whether a subsequent utterance received by an automated assistant but ultimately rejected as an utterance directed to the automated assistant will trigger an extension of the timeout duration used to terminate a session with a user. The utterance may be rejected, for example, if it is determined to be not directed to the automated assistant, spoken by someone other than the user associated with the session, part of the response presentation itself, or other background noise. For example, as illustrated in FIGS. 8 and 9, it may be desirable control whether or not a rejected utterance causes an additional re-open mic message to be issued at the conclusion of a response presentation based upon whether the utterance began before or after conclusion of the response presentation. In FIG. 8, for example, a text to speech response presentation (arrow 270) is illustrated as overlapping in time with a re-open message with a specified timeout duration (arrow 272). In FIG. 8, a new utterance is received prior to completion of the response presentation, while in FIG. 9, a new utterance is received after completion of the response presentation. In the former case, a second re-open mic message may be issued, while in the latter case, no new message may be issued. Tracking logic, e.g., implemented in a client device or a cloud-based service, is illustrated by sequence of operations 280 of FIG. 10, where upon expiration of a timeout duration (block 282), a determination may be made as to whether a rejected utterance was received during the timeout period (block 284) and if so, whether that rejected utterance was received prior to the completion of the response presentation (block 286). If both conditions are true, another timeout period may be requested (block 288), while if either condition is not true, no further waiting may be required, and the session may be terminated (block 290).

Figure 11:
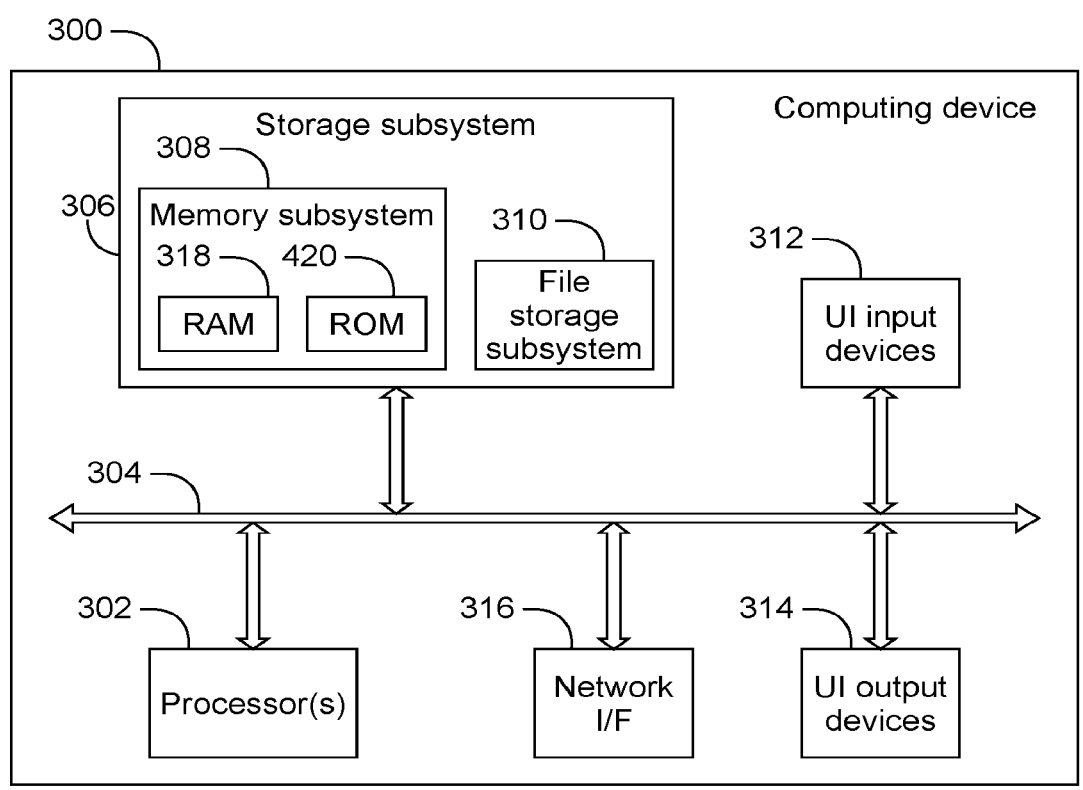
FIG. 11 illustrates an example architecture of a computing device.

FIG. 11 is a block diagram of an example computing device 300 suitable for implementing all or a part of the functionality described herein. Computing device 300 typically includes at least one processor 302 that communicates with a number of peripheral devices via bus subsystem 304. These peripheral devices may include a storage subsystem 306, including, for example, a memory subsystem 308 and a file storage subsystem 310, user interface input devices 312, user interface output devices 314, and a network interface subsystem 316. The input and output devices allow user interaction with computing device 300. Network interface subsystem 316 provides an interface to outside networks and is coupled to corresponding interface devices in other computing devices.

User interface input devices 312 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 300 or onto a communication network.

User interface output devices 314 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 300 to the user or to another machine or computing device.

Storage subsystem 306 stores programming and data constructs that provide the functionality of some or all of the modules described herein. For example, the storage subsystem 306 may include the logic to perform selected aspects of the various sequences illustrated in FIGS. 5, 7 and/or 10.

These software modules are generally executed by processor 302 alone or in combination with other processors. Memory 308 used in the storage subsystem 306 can include a number of memories including a main random access memory (RAM) 318 for storage of instructions and data during program execution and a read only memory (ROM) 420 in which fixed instructions are stored. A file storage subsystem 310 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 310 in the storage subsystem 306, or in other machines accessible by the processor(s) 302.

Bus subsystem 304 provides a mechanism for enabling the various components and subsystems of computing device 300 to communicate with each other as intended. Although bus subsystem 304 is shown schematically as a single bus, alternative implementations of the bus subsystem may use multiple busses.

Computing device 300 can be of varying types including a mobile device, a smartphone, a tablet, a laptop computer, a desktop computer, a wearable computer, a programmable electronic device, a set top box, a dedicated assistant device, a workstation, a server, a computing cluster, a blade server, a server farm, or any other data processing system or computing device. Due to the ever-changing nature of computers and networks, the description of computing device 300 depicted in FIG. 11 is intended only as a specific example for purposes of illustrating some implementations. Many other configurations of computing device 300 are possible having more or fewer components than computing device 300 depicted in FIG. 11.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. An automated assistant device, comprising:
a microphone;
one or more processors; and
memory operably coupled with the one or more processors, wherein the memory stores instructions that, in response to execution of the instructions by one or more processors, cause the one or more processors to perform a method that includes:
 initiating a first utterance fulfillment operation to cause an automated assistant component to generate a first response to a first utterance captured by the microphone;
 presenting the first response to the first utterance, including playing back an audio response associated with the first response;
 monitoring an audio input during presentation of the first response to the first utterance captured by the microphone, wherein monitoring the audio input includes generating audio data associated with a second, hot-word free utterance spoken during playback of the audio response of the presentation of the first response and captured by the microphone;
 initiating an utterance classification operation for the audio data during playback of the audio response of the presentation of the first response to determine if the second, hot-word free utterance is likely directed to the automated assistant device;
 in response to determining from the utterance classification operation that the second, hot-word free utterance is likely directed to the automated assistant device, initiating a second utterance fulfillment operation to cause the automated assistant component to generate a second response for the second, hot-word free utterance; and
 pre-empting playback of the audio response of the presentation of the first response on the automated assistant device with a presentation of the second response on the automated assistant device.

2. The automated assistant device of claim 1, wherein initiating the utterance classification operation includes providing the audio data to an utterance classification service that includes a neural network-based classifier trained to output an indication of whether a given utterance is likely directed to an automated assistant.

3. The automated assistant device of claim 2, wherein the utterance classification service is configured to obtain a transcription of the second, hot-word free utterance, generate a first, acoustic representation associated with the audio data, generate a second, semantic representation associated with the transcription, and provide the first and second representations to the neural network-based classifier to generate the indication.

4. The automated assistant device of claim 3, wherein the first and second representations respectively include first and second feature vectors, and wherein the utterance classification service is configured to provide the first and second representations to the neural network-based classifier by concatenating the first and second feature vectors.

5. The automated assistant device of claim 2, wherein the automated assistant device is a client device, and wherein the utterance classification service is resident on the automated assistant device.

6. The automated assistant device of claim 2, wherein the automated assistant device is a client device, and wherein the utterance classification service is remote from and in communication with the automated assistant device.

7. The automated assistant device of claim 1, wherein the automated assistant device is a client device and the automated assistant component is resident in the automated assistant device, and wherein initiating the first and second utterance fulfillment operations includes processing the first and second utterance fulfillment operations on the automated assistant device.

8. The automated assistant device of claim 1, wherein the automated assistant device is a client device and the automated assistant component is resident in a service that is remote from and in communication with the automated assistant device, and wherein initiating the first and second utterance fulfillment operations includes initiating the first and second utterance fulfillment operations on the service that is remote from and in communication with the automated assistant device.

9. The automated assistant device of claim 1, further comprising performing acoustic echo cancellation on the audio data to filter at least a portion of the audio response from the audio data.

10. The automated assistant device of claim 1, wherein the method further includes performing speaker identification on the audio data to identify whether the second, hot-word free utterance is associated with the same speaker as the first utterance.

11. The automated assistant device of claim 1, wherein the second, hot-word free utterance is dependent upon the first utterance, the method further including propagating an updated client state for the automated assistant device in response to the first utterance prior to completing presentation of the first response such that generation of the second response is based upon the updated client state.

12. The automated assistant device of claim 1, wherein the method further includes, after pre-empting presentation of the playback of the audio response of the first response on the automated assistant device with the presentation of the second response on the automated assistant device:
 monitoring the audio input during presentation of the second response;
 dynamically controlling a monitoring duration during presentation of the second response; and
 automatically terminating an automated assistant session upon completion of the monitoring duration.

13. The automated assistant device of claim 12, wherein dynamically controlling the monitoring duration includes automatically extending the monitoring duration for a second time period in response to determining after a first time period that the presentation of the second response is not complete.

14. The automated assistant device of claim 13, wherein automatically extending the monitoring duration for the second time period includes determining the second time period based upon a duration calculated from completion of the presentation of the second response.

15. The automated assistant device of claim 1, wherein pre-empting the playback of the audio response of the presentation of the first response on the automated assistant device with the presentation of the second response on the automated assistant device includes discontinuing the playback of the audio response of the presentation of the first response.

16. The automated assistant device of claim 1, further comprising continuing the playback of the audio response of the presentation of the first response after pre-empting the playback of the audio response of the presentation of the first response.

17. An automated assistant device, comprising:
a microphone;
one or more processors; and
memory operably coupled with the one or more processors, wherein the memory stores instructions that, in response to execution of the instructions by one or more processors, cause the one or more processors to perform a method that includes:
  in response to an utterance received by the automated assistant device, receiving a response at the automated assistant device from a remote automated assistant component, wherein the response includes a first instruction that instructs the automated assistant device to initiate monitoring of an audio input for a first time period during playback of an audio response of a presentation of the response by the automated assistant device;
  after the first time period and prior to completion of the playback of the audio response of the presentation of the response by the automated assistant device, receiving a second instruction from the remote automated assistant component that instructs the automated assistant device to initiate monitoring of the audio input for a second time period during the playback of the audio response of the presentation of the response by the automated assistant device, wherein at least a portion of the second time period extends beyond the playback of the audio response of the presentation of the response by the automated assistant device;
  after the second time period and after completion of the playback of the audio response of the presentation of the response by the automated assistant device, receiving a third instruction from the remote automated assistant component that instructs the automated assistant device to initiate monitoring of the audio input for a third time period, wherein the duration of the third time period is determined based upon a time at which the playback of the audio response of the presentation of the response is completed by the automated assistant device; and
  automatically terminating an automated assistant session upon completion of the third time period.

18. The automated assistant device of claim 17, wherein the utterance is a hot-word free utterance, and the method further includes performing an utterance classification operation on the utterance to determine if the utterance is likely directed to the automated assistant device, wherein receiving the response at the automated assistant device is performed in response to determining from the utterance classification operation that the utterance is likely directed to the automated assistant device.

19. The automated assistant device of claim 17, wherein the utterance is a first utterance, wherein the method further includes, in response to a second utterance received by the automated assistant device during the second time period, determining that the second utterance is not directed to the automated assistant device, and wherein instructing the automated assistant device to initiate monitoring of the audio input for the third time period is performed only if the second utterance is received prior to completion of the playback of the audio response of the presentation of the response by the automated assistant device.

* * * * *